C. Wheeler Jr.
Harvester Rake.
Patented Apr. 7, 1868.
N° 76571
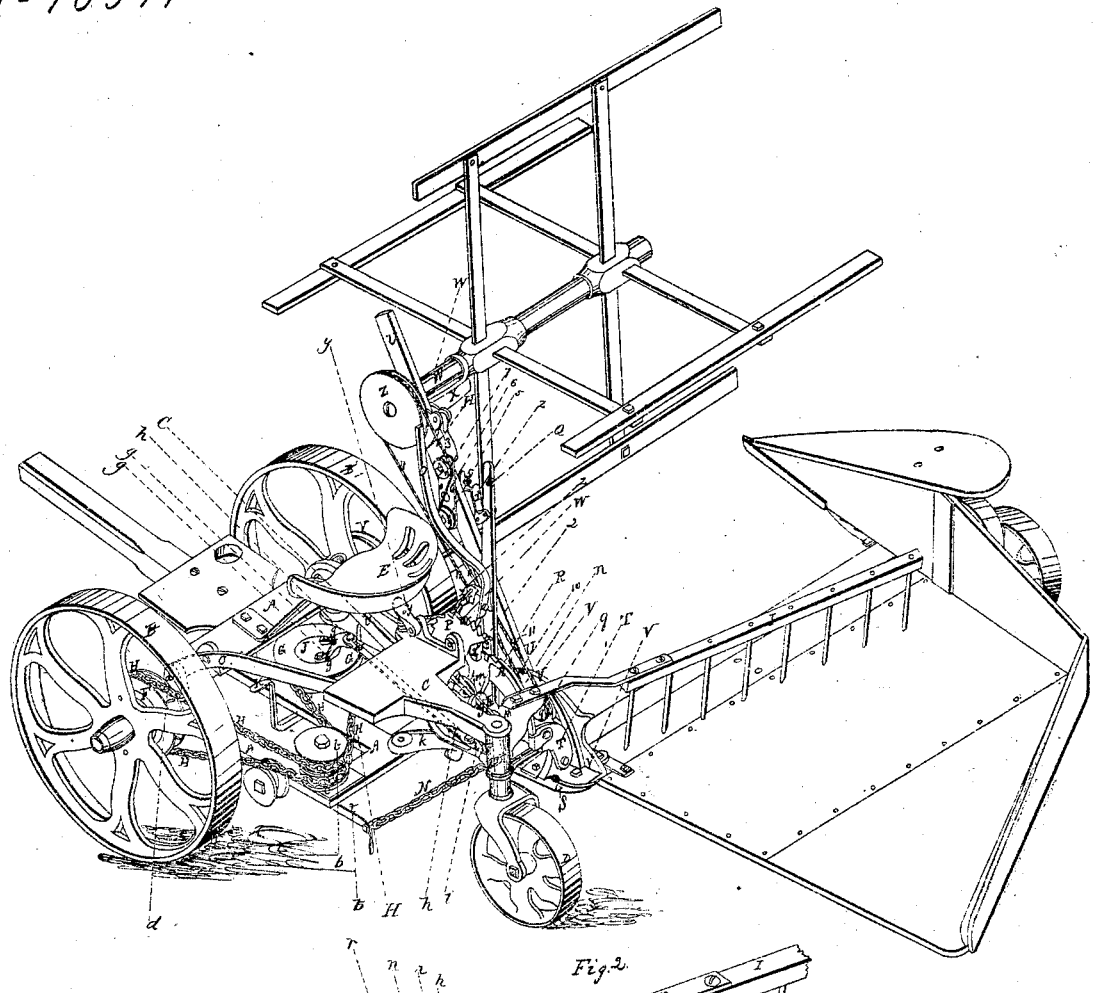
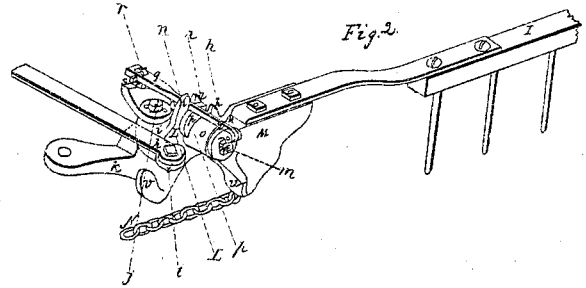
Fig. 2.
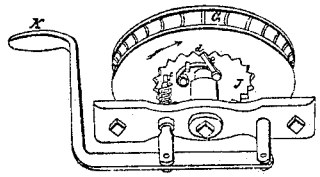
Fig. 3.
Witnesses.
Inventor
C. Wheeler Jr.
By atty A. P. Stoughton

United States Patent Office.

CYRENUS WHEELER, JR., OF AUBURN, NEW YORK.

*Letters Patent No. 76,571, dated April 7, 1868.*

---

IMPROVEMENT IN HARVESTERS.

---

*The Schedule referred to in these Letters Patent and making part of the same.*

---

TO ALL WHOM IT MAY CONCERN:

Be it known that I, CYRENUS WHEELER, Jr., of Auburn, in the county of Cayuga, and State of New York, have invented certain new and useful Improvements in Harvesting-Machines and their rakes; and I do hereby declare the following to be a full, clear, and exact description of the same, reference being had to the accompanying drawings, making a part of this specification, in which—

Figure 1 represents in perspective a harvesting-machine, and rake attached, made after my general plan.

Figure 2 represents in perspective the rake and some of its more immediately connected operative parts, as detached from the machine.

Figure 3 represents in perspective a view of the rake-driving sheave or pulley, and its connecting and disconnecting-mechanism, taken from below, or underneath said sheave or pulley.

Similar letters of reference, where they occur in the separate figures, denote like parts of the machine in all of the drawings.

My invention relates mainly to the rake, its connection and operation, and the mechanism for moving and stopping its movements; also its particular motion in cutting in under the reel, so as to sweep the platform from a point underneath the line or circuit of the reel, or from a point close to the cutters, thus insuring the delivery of the stalks, however short they may be.

And my invention further relates to a mechanism for taking up the slack in the chain or band that drives the reel, or letting it out, when the reel is lowered or raised on its support, and thus always keeping the chain or band taut, wherever the reel may be working.

To enable others skilled in the art to make and use my invention, I will proceed to describe the same, with reference to the drawings.

The main frame A, which may be made of metal, is hinged at its front end to the main axle, which in turn is supported in the two main supporting and driving-wheels B B'. To the front of the main frame, as at $a$, is hinged the seat-frame C, the after part of which is supported upon a pivoted caster-wheel, D, so that said seat-frame maintains a uniform height above the ground, which is regulated by the height of the main wheels and caster, whilst the main frame, at its rear, is suspended from the seat-frame, and can be raised or lowered, and held thereon, by a mechanism that will be hereafter described.

The cutter-bar, finger-bar, platform, reel, and its support are connected to the main frame by a pivoted joint, around which they can be turned at pleasure, to raise or lower the points of the guards and cutters, by means of a lever connected therewith and with the main frame, and extending up within convenient reach of the driver in his seat E. The cutting-apparatus is raised and lowered in a vertical direction by raising or lowering the rear end of the main frame, to which rear part the cutting-apparatus is connected to and in line with.

On the main axle, near the drive-wheel B, and connected with said main wheel by a pawl-and-ratchet connection, in the usual well-known way, and for the usual well-known purpose, there is a chain-wheel, F, occupying from its connection a vertical position; and suitably supported upon the main frame there is another chain-wheel, sheave, or pulley, G, occupying a horizontal position; and over these two chain-wheels F G, and over or around intermediately-placed friction-pulleys $b\ c$ passes an endless driving-chain, H, which gives motion to the wheel, sheave, or pulley G, from which the rake I is driven, as will be explained.

The chain-wheel, sheave, or pulley G is of itself a rim, but it has a central portion, J, on or with which it moves, as the case may be, there being a ratchet-and-pawl ($d\ e$) connection between them, as also a spring-bolt, $f$, which devices connect or disconnect the two parts under certain circumstances, and thus allow the portion, G, to always run with the chain, which is in constant motion as the machine advances, whilst the central portion, J, that moves the rake, only moves at the will of the driver in his seat, who simply, with his foot, presses down the lever K when he wants the rake to go into action, such movement of the lever, as shown at fig. 3, drawing out the spring-bolt $f$, and allowing the pawl $e$ to act, and thus operate the rake.

When the rake has completed its movement—that is, swept off the platform and raised up into a somewhat vertical position—the wheel has turned sufficient to bring the pawl $e$ against the bolt or tripper, which throws the pawl out from the ratchet, and the rake then remains at rest until the driver again puts it in action by moving the lever K again with his foot, and thus removing the bolt, and allowing the pawl to act again in uniting the two parts and causing them to move together.

On the upper portion of part, J, of the chain-wheel, sheave, or pulley, are arms $g$, to which one end of a connecting-rod, $h$, is attached, the other end of said rod being attached to a crank-arm, $i$, on the rake-head plate L, said rake-head plate being hung so as to turn on a stud or post, $j$, supported in a bearing-plate, $k$, which is also a cam-plate, to aid in operating the rake.

The rake I, though moving with the rake-head plate L, at times, around the stud or centre $j$, has also another, viz, a rising and falling motion, upon another stud or journal, $m$, which, though more nearly horizontal, is inclined at an angle from its horizontality, for a purpose, in connection with the rake, that is highly important to its action, and which will be explained.

On the rake-plate L, fig. 2, there is a forked upright piece, $n$, and on the sleeve or boss $o$ of the rake-shank M there is a notched flange, $p$. On the boss $o$, or to the pivot-bolt $m$ on which it moves, there is hinged a lever, $q$, which has a down-hanging arm, $r$, at its free end. This lever $q$ always remains in the crotch or fork of the piece $n$, and when the rake rises, so that the notch in the flange $p$ comes under this lever, it (the lever) drops into the notch in the piece, $p$, and thus the boss or hub of the rake $o$, and the rake-plate or its hub or boss, are united and move together, and with the lever $q$, until the arm $r$ on said lever, in riding up on the cam-plate $s$, raises up said lever until the boss $o$ is released, and the rake will then fall; and, in descending, the obliquity of the stud or pivot $m$, on which it is hinged, causes it to move in under the reel, and drop at or near the rear of the fingers, and so near to the cutters as to insure its taking all the straw on the platform, however short it may be.

Rakes of this kind have heretofore dropped perpendicularly in a line with, or tangential to, the circuit of the reel, and hence never reached the front of the platform, as the circuit of the reel extends some distance in rear of the cutters. By giving my rake a shearing motion under the reel, I get close up to the cutters with the rake, and catch and sweep off the straw, however short it may be.

The plate or head M, to which the rake I is attached by its shank, is connected to a spring or spring-bar, $t$, by a chain, N, which chain becomes strained or tightened up, and also strains up said spring, before the rake reaches the point where it is released and allowed to fall; and when the rake falls, or shears in under the reel, it does so under the tension of the spring; and this tension exerts itself the moment the rake is ready to begin to clear the platform, in starting, and aiding the rake to start, from its state of rest without jar or such suddenness as would be likely to disarrange any of the parts.

When the rake has swung around and cleared the platform, and delivered the gavel upon the ground, a projection, $u$, on the plate M comes against a cam, $v$, on the plate $k$, which causes the rake to rise up, and as it rises, its boss and the slotted flange $p$ turn on the stud or pivot $m$ until the lever $q$ drops into the notch in the flange $p$, and thus locks the rake in its raised-up position, and until the driver again puts the rake in motion by pressing upon the lever K, when the riding up of the arm $r$ upon the cam-plane $s$, as before described, raises the lever or latch, and releases the rake, which drops or cuts under the reel, as before.

O is a lever connected to an arc, P, on which a ratchet, $w$, is made, and $x$ is a spring-pawl working in said ratchet, said pawl being thrown out by a foot-lever, $y$, operated by the driver, and thrown in by the spring. The main frame is suspended from this lever O by a chain, $z$, and by it is raised and held up, or let down, at pleasure.

Q is a lever, having a grasping-piece, 1, connected with it, which grasping-piece connects with a spring-bolt, 2, that takes into notches in a permanent arc, R, fastened to the main frame; and the lever Q is hung on a pivot, at or near the centre of the arc R, and is connected to the shoe S by arms T, so that the driver, from his seat, can raise or lower, and fasten at the proper position, the points of the guards, and the cutters working therein.

The reel-post U is secured at its heel to a plate, V, fastened to the shoe S, and can be adjusted on said plate, which has a series of holes in it for that purpose. The reel-shaft W is supported in a saddle, X, which can be adjusted on said reel-post U, and, when adjusted, firmly held by a clamping-lever, 3.

On the reel-post is arranged, by a slot and set-screw, 4 5, an arm, 6, that carries two friction-pulleys 7 8, one on each of its ends; and on the plate V are two other friction-pulleys, 9, 10, around or over which pulleys, and around or over the main driving-pulleys Y Z, passes an endless belt or chain, 11, as shown by the drawing, for driving the reel.

The object of the arm 6 and its pulleys 7 8 is to take up the slack of the driving-chain when necessary, or to adjust it when the reel is raised or lowered.

Having thus fully described my invention, what I claim therein as new, and desire to secure by Letters Patent, is—

1. The combination of the endless and continuously-moving chain, as the machine advances, the rim G, and its interior wheel J, with ratchet, pawl, and spring-bolt attachment, for the purpose of setting in motion and driving a rake, at the will of the operator, which rake is automatically thrown out of action at the completion of every sweeping operation, substantially as described.

2. I also claim, in combination with a rising and falling and sweeping rake, the two pivots or centres of motion $i$ $m$, the latter being oblique to and in a different plane from the former, so that, as the rake drops upon the platform, it will cut or shear in under the reel, and fall more nearly to the cutting-point, and thus reach all the straw, however short it may be, substantially as described.

3. I also claim, in combination with a rising and falling and sweeping rake, the armed lever $q$, cam $s$, and notches at or near the parts *n p*, for the purpose of connecting and disconnecting the two parts, substantially as and for the purpose described.

4. I also claim, in combination with the endless chain for driving the reel, the swinging and adjustable arm 6, with its pulleys, one in each end thereof, for taking up the slack of or letting out the chain, as the reel is lowered or raised on its post, substantially as described.

C. WHEELER, Jr.

Witnesses:
A. B. STOUGHTON,
C. D. WRIGHTINGTON.